Aug. 25, 1959          G. BOULET          2,901,243
VEHICLE SUSPENSION SYSTEM
Filed March 5, 1956          2 Sheets-Sheet 1
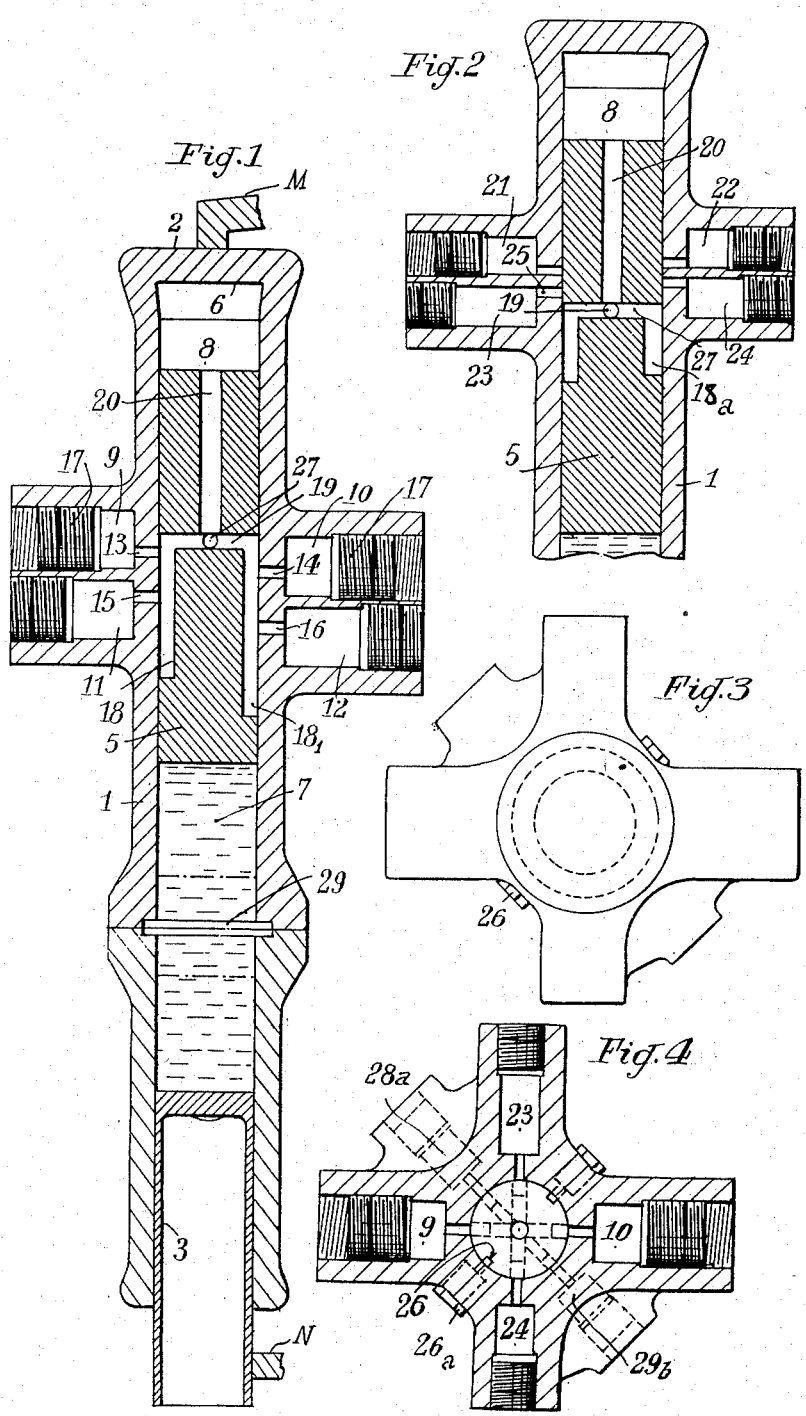

Aug. 25, 1959 G. BOULET 2,901,243
VEHICLE SUSPENSION SYSTEM
Filed March 5, 1956 2 Sheets-Sheet 2
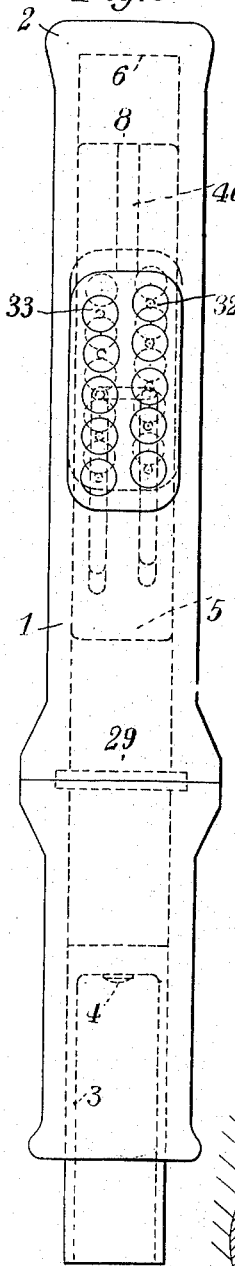
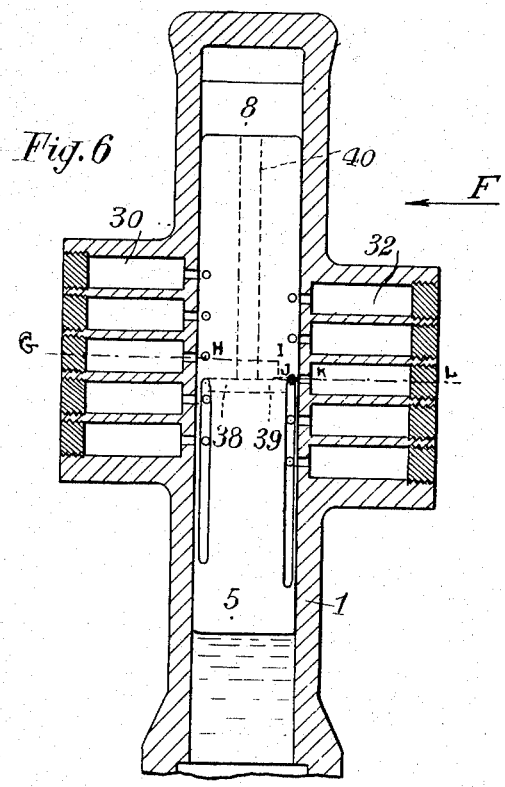
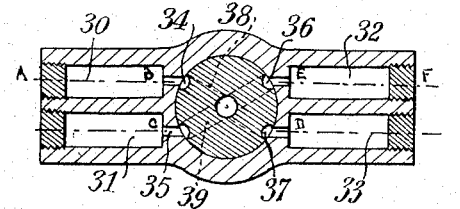
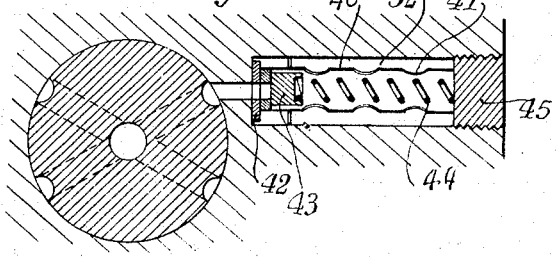

United States Patent Office 2,901,243
Patented Aug. 25, 1959

2,901,243

VEHICLE SUSPENSION SYSTEM

Georges Boulet, Toulouse, France, assignor to Société à responsabilité limitée; Recherches Etudes Production R.E.P., Paris, France, a corporation of France Application March 5, 1956, Serial No. 569,426

Claims priority, application France May 5, 1955

8 Claims. (Cl. 267—65)

This invention relates to vehicle systems.

In an ordinary pneumatic suspension system, a body of gas is enclosed in a chamber, the volume of which varies in accordance with the oscillations applied to the suspended masses, the body of gas being thus subjected to alternations of compression and of de-compression. In a system of this kind, the frequency of the oscillatory movements varies with the length of these movements and also with the initial load.

It is especially desirable that the frequency of the vertical oscillations of a suspended vehicle should be in the vicinity of 1.3 per second, which is the frequency of the steps of a man walking and to which frequency the muscles of the body are best adapted.

An object of the present invention is to provide a pneumatic suspension for vehicles by means of which the above condition of frequency is obtained or at least is approached as closely as may be desired despite load conditions and so forth. It is moreover within the purview of the invention to provide a suspension which conforms to any desired law of frequency or of flexibility.

A suspension provided in accordance with the invention is characterized in that to a chamber of variable volume and containing a body of gas, there are added two series of auxiliary chambers, one of which, for any given suspended mass or for any given static load of a vehicle, is in communication with the variable-volume chamber, while the other series of chambers is isolated from the said chamber, means being provided in order that, when the chamber of variable-volume is reduced below the volume of reference corresponding to the suspended mass or the static load of the vehicle, the auxiliary chambers of the second series are placed in succession in communication with the said chamber, those of the first series remaining in communication with it, and in order that, when the chamber of variable volume is increased beyond the same volume of reference, the auxiliary chambers of the second series remain closed while those of the first series are closed in succession.

There will be described below, by way of examples only and without any implied limitation, two forms of a pneumatic suspension in accordance with the invention, the first relating to a suspension in which the auxiliary chambers correspond to variations in load of equal value, and the second to variations of elongation of equal value.

The first form is illustrated by Figs. 1 to 4 of the appended drawings, and the second by Figs. 5 to 8.

Fig. 1 is an axial cross-section of a suspension jack;

Fig. 2 is an axial cross-section taken at right angles to the structure of Fig. 1;

Fig. 3 is a top view of the jack, and Fig. 4 is a transverse cross-section of the jack;

In Figs. 5 to 8, there is shown a further embodiment of the invention.

Fig. 5 is a view in elevation in the direction of the arrow F of Figs. 6 and 7;

Fig. 6 is a cross-section taken along line A—B—C—D—E—F of Fig. 7;

Fig. 7 is a view taken along line G—H—I—J—K—L of Fig. 6; and

Fig. 8 is a view, on a larger scale, of a detail of Fig. 7.

Referring now to Fig. 1, the jack of the first embodiment comprises a cylinder 1, the upper part 2 of which is fixed or pivotally-mounted on the suspended portion M of the vehicle, and in which is arranged a slidable piston 3 coupled to the oscillation axis of the wheel or non-suspended portion N of the vehicle. In the cylinder 1 is movably mounted a further piston 5 which forms between the first piston 3 and the base 6 of the cylinder, two chambers 7 and 8. These chambers are respectively filled with a liquid and with a gas.

Laterally of the cylinder are arranged chambers 9—10—11—12, which communicate with the interior of the cylinder by means of passages 13—14—15—16 located at different levels. These chambers are isolated from the exterior by threaded plugs 17. Lateral grooves 18—18$_1$ of the piston 5 are connected to each other and to the chamber 8 by a transverse passage 19 and a longitudinal passage 20 formed in the piston 5.

In the position shown in Fig. 1, the chambers 9—10—11—12 are all in communication with the chamber 8, but the piston 5, is moving downwards inside the cylinder, sequentially covers the communication orifices 13—14—15—16, thus isolating in succession the chambers 9—10—11—12 of the chamber 8.

In Fig. 2, there is seen in a longitudinal section at right angles to that of Fig. 1, chambers 21—22—23—24, isolated from the exterior and communicating with the interior of the cylinder by means of transverse passages 25 arranged at different levels. For the same position of the piston 5 in the cylinder 1 as that shown in Fig. 1, the passages 25 are closed by the piston 5. This latter is provided with lateral grooves 18a which communicate with the chamber 8 by a transverse passage 27 and by the longitudinal passage 20. During an upward movement of the piston 5 in the cylinder 1, the passages 25 are sequentially placed in communication with the chamber 8. The lateral grooves 18 of Fig. 1 extend sufficiently towards the bottom so that, in a raised position of the piston which puts all the chambers 21—22—23—24 in communication, the chambers 9—10—11—12 are also in communication with the chamber 8.

With the piston in a raised position which puts all the orifices in communication with the chamber 8, there is introduced through the bottom of the cylinder, for example through a valve, a quantity of gas which fills all the chambers together with the chamber 8 at a pressure and at a temperature determined in advance by the physical characteristics of the desired suspension. Thus, in the example shown, the weight of gas introduced has been determined in order that, under the normal static load of the vehicle, the piston occupies when at rest in the cylinder, a position of reference such as that shown in Figs. 1 and 2 in which the chambers 9 to 12 are in communication with the chamber 8, while the chambers 21 to 24 are cut off from the said chamber.

The operation of the suspension is as follows:

If the jack is actuated by the effect of inertia due to the vehicle passing over a non-level portion of the road, the chambers 23—24—21—22 are added in succession to the chamber 8 and take part in the suspension. On the other hand, if the jack is extended, the chambers 9—10—11—12 are cut-off in succession from the initial volume which they formed with the chamber 8, and do not then take part in the suspension. The result of this is that, depending on the position of the piston, the weight of the active gas varies with the number of chambers in communication.

The number of chambers may be different from that indicated. An increase in the number of the chambers enables an almost continuous variation of the useful weight of gas to be obtained.

It is desirable that the fluid-tightness of the piston 5 in its cylinder should be such that during the rapid movements of the piston, the chambers, which are effectively taken away from the main chamber, remain at the pressure which existed in them at the moment at which they ceased to be in communication with the main chamber. However, even if this fluid tightness is not effected in a perfect manner, the operation of the suspension system is not thereby substantially affected.

The chambers may be of any desired shape such as, for example, that of a cylinder. If they are formed of cylinders of the same diameter and are spaced in stages to give uniform variations in load, each of them has a characteristic length. It is furthermore possible to regulate the volume of each of them by varying the insertion of the threaded plug. In order to insure an improved fluid-tightness of the chambers, there may be provided in the chambers, at the entrance of the passages communicating with the interior of the cylinder, check-valves for preventing the fluid and the gas from passing between the cylinder and the piston when the grooves are not level with these passages.

Attention is directed to the extreme simplicity of the device, which is able to operate with a single moving member, and the machining of which only consists of bores, holes and threads, of which one bore only requires to be carefully provided.

The piston 5 should not be able to rotate about its axis if the grooves are rectilinear and the orifices of the chambers correspond to each groove in the same diametral plane. On the other hand, the orifices may be in different diametral planes, in which case the grooves will be, for example, helicoidal and the piston will be given a corresponding spiral movement. In both cases, one or a number of guiding keys 26 (see Fig. 4) pass into one or several grooves of the piston and thus impart thereto the desired movement. These keys 26 may be mounted on the extremities of threaded plugs 26a which are screwed into the body of the cylinder.

If it is desired to adapt a single suspension device to vehicles which are subject to variable static loads, for example an automobile when empty or in various states of load, the cylinder may be provided with supplementary correcting chambers such as chambers 28a and 28b, which are arranged at 45° to the two perpendicular diametral planes which pass through the axes of the two families of chambers. In the case of small static loads, they do not take any part in the suspension but are active only for higher static loads. The chambers are rendered operative or inoperative by opening or closing their orifices.

Provision may be made at 29, in the midst of the liquid 7, for any system of braking intended to restrict the movement of the liquid in one direction or the other, such as is utilized in the case of hydraulic shock absorbers, valves or passages of small section producing a braking effect by a throttling action or by viscosity.

The suspension of the invention may be combined with any spring suspension of known type.

A theory of the monochronous operation of the suspension according to the invention is briefly sketched below.

In the pneumatic jack, the effective weight P of gas for the position of reference of the laden vehicle, stationary or moving at uniform speed over a horizontal plane is:

(1) $P_{gas} = \omega . s . l$ where $\omega$ is the specific weight of the gas in this state (weight per unit volume); $s$ is the cross-section of the jack; $l$ is the length of the jack, the product $s.l$ defining the necessary volume $V_1$ of gas enclosed to obtain, for example, a frequency $N=1.3$ under the conditions of load referred to above.

Now it is known that, in isentropic operations, the frequency of the oscillations is given by the formula:

(2) $N = \frac{1}{2\pi}\sqrt{\frac{gk}{l}}$ where $k$ is the ratio of $C_p/C_v$ of the specific heats of the gas at constant pressure and at constant volume.

The Formula 2 can be written:

(3) $N = \frac{1}{2\pi}\sqrt{\frac{gk\omega s}{P_{gas}}}$

In the second number, $$\frac{\omega}{P_{gas}}$$

should remain constant in order that N may be constant.

When the jack is compressed, $\omega$ increases as a function of the internal pressure and it is necessary to increase P. It is precisely this function which is achieved by the invention.

In the embodiment illustrated in Figs. 5–8, all the chambers have the same volume and their orifices are uniformly spaced apart, each chamber which is added or taken away representing in volume the volume swept by the piston in the corresponding displacement.

In the example shown, the added or subtracted chambers are cylinders of the same diameter and of the same length. They are arranged in this case in four series 30, 31, 32 and 33, the even number chambers having their axes in the same plane and the odd number chambers having their axes parallel to those of the even number chambers.

The communication orifices of the cylindrical chambers are formed in the axis of these chambers. The even number chambers thus constitute two series located on each side of a diametral plane, and the odd number chambers also constitute two series located on each side of the same plane. In each series, the axes are equidistant and the equidistance is the same for the four series. The axes of the two even number series of chambers are equidistant from the axes of the other series of even number chambers. This is also the case for the axes of the two series of odd number chambers. In addition, the axes of one series of even number chambers are equidistant from the axes of the series of juxtaposed odd number chambers. The result of this is that the communication orifices are spaced apart in successive equidistant planes.

The piston 5 is provided, starting from the same transverse plane, with four grooves 34—35, 36—37 extending towards the bottom, respectively facing the four series of orifices. These grooves extend far enough towards the bottom of the piston, without however reaching the lower extremity of the piston, so that in a certain raised position of the piston, each groove is in communication with all the orifices of the corresponding series of chambers, and the length of the piston is such that, in the bottom position of the piston, all the orifices are closed by its upper portion. The upper extremities of the grooves communicate with each other by means of two conduits 38—39, which communicate with the longitudinal conduit 40.

As in the case of the preceding embodiment, the chamber 8 and the lateral chambers 30 to 33 are filled with a quantity of gas under conditions of pressure and of temperature such that, under the effect of the normal load of the vehicle, the piston takes up a position in the cylinder at the height shown in Figs. 5 and 6 whereby, for example, half of the lateral chambers is in communication with the chamber 8 while the other half is not.

If the piston moves upwards in the cylinder, fresh chambers are successively put in communication with the chamber 8, and they have a volume equal to that produced by the movement of the piston in opening the new orifice which puts them into communication with the chamber 8. On the other hand, when the piston moves downwards in the cylinder, successive chambers are put out of communication with the chamber 8, and these also are all equal in volume to the increase in volume of the chamber caused by the passage of the piston from one stage to that following.

With this arrangement, the oscillations are monochronous, not only for a given static load but for any value whatever of static load within the limits of use of the jack.

Fig. 8 shows a system using an anti-leakage valve for preventing the return of the gas from the chambers towards the cylinder. In the chamber 32 is housed a tube 40 which is pierced with orifices 41 and which is supported by a gas-tight joint 42. In the tube is placed a valve 43 against which is pressed a spring 44, compressed by the plug 45.

An explanation of Fig. 8 is as follows: if the chambers 30, 31, 32, 33 communicate directly by passages with the inside of the main cylinder, leaks may occur between the inner wall of this cylinder and the surface of piston 5 when the chambers have a greater pressure than chamber 8. Such leaks would then increase the pressure in this chamber. Although this would not be a very serious defect, the auxiliary chambers are provided with flap valves 43 which stop the reflux of pressure toward the main cylinder. On the other hand, a system of flap valves and longitudinal grooves (not shown) is provided between the piston and the main cylinder in order to prevent the piston from turning.

As in the case of the previous example, the vertical movement of the piston is controlled by keys. The lateral chambers may, of course, be arranged otherwise than in the manner shown in the drawings. Instead of being in groups arranged two by two at 180° from each other, they may be radial and disposed at any angular spacing.

For the piston, there can be used with advantage a piston of the so-called self-greasing type of a metal or an alloy having this property or which has this property due to sulphiding or by any other adequate means.

It should be understood that the auxiliary chambers which are the essential feature of the invention, may be formed and grouped in other ways than those shown and described, so as to conform with any law of flexibility or of frequency as may be desired.

The machining operations on the auxiliary chambers and the threaded plugs which close the bottom of the chambers may be eliminated by having the chambers formed by castings which are completely closed with the exception of the holes communicating with the main cylinder.

The suspension may be applied to all vehicles such as, for example, land and airborne vehicles and also to all masses which are suspended by means of pneumatic jacks.

What is claimed is:

1. A pneumatic suspension for a vehicle having suspended and non-suspended portions, comprising means coupled to the suspended and non-suspended portions and defining a chamber the volume of which varies with the suspended load, means defining auxiliary chambers of constant volume, isolating and communicating means between said auxiliary chambers and the chamber with variable volume such that, with a reference volume of the variable-volume chamber corresponding to a predetermined distance of the suspended and non-suspended portions, a first group of the auxiliary chambers communicate with said variable chamber whereas a second group are isolated therefrom, so that, with the variable-volume chamber reduced below the reference volume, the second group of auxiliary chambers are successively put in communication with the variable-volume chamber, those of the first group remaining in communication with the variable-volume chamber, and so that, with the variable-volume chamber increased above the reference volume, the auxiliary chambers of the second group remain isolated while those of the first group are isolated successively; the variable and invariable chambers together enclosing a constant total weight of a pneumatic medium, the amount of which is such that, under a given static load of the suspended portion, the volume of the variable chamber is the reference volume.

2. A suspension system comprising a cylinder member and a first piston member slidingly movable in said cylinder member, one of said members being operatively connected to the suspended portion and the other to the non-suspended portion of a vehicle, said members defining a chamber of variable volume dependent on the load of the suspended portion, means defining axial passages and invariable volume auxiliary chambers communicating with said cylinder by said axial passages, said passages and said piston being relatively positioned such that, in a predetermined reference position, a first group of auxiliary chambers is in direct communication with the variable-volume chamber, while the passages of a second group are closed by the piston, so that, with the piston moved in the cylinder to reduce the volume of the variable-volume chamber, the passages of the first group remain open while those of the second group open in succession, and so that, with the piston moved in the cylinder from said position of reference to increase the volume, the passages of the second group remain closed by the piston while those of the first group are closed in succession, the variable and invariable chambers together enclosing a constant total weight of a gas, the amount of which is such that, under a given static load, said piston and said cylinder occupy the predetermined reference position.

3. A suspension system according to claim 2, comprising a second piston in said cylinder and wherein the operative connection between said first piston and a portion of the suspension system is effected by said second piston pivotably mounted on said portion and by a liquid interposed between the two pistons.

4. A suspension system according to claim 2, wherein all the auxiliary chambers have equal volumes and wherein their passages communicating with the cylinder are equally spaced, thus constituting a monochronous suspension independent of static load and oscillations.

5. A suspension system according to claim 2, wherein the axial passages are equally longitudinally spaced and wherein the volumes of one of the groups of the auxiliary chambers are larger in sequence from the position of reference.

6. A suspension system according to claim 2, wherein the passages are equally longitudinally spaced and wherein the volumes of one of the groups of the auxiliary chambers are smaller in sequence from the position of reference.

7. A suspension system according to claim 2, comprising means defining supplementary chambers for increases of static charge, the total weight of gas being thereby increased.

8. A suspension system according to claim 2, comprising valves in the auxiliary chambers to maintain therein the pressure existing when the chambers are put into and out of operation.

References Cited in the file of this patent
UNITED STATES PATENTS

| | | |
|---|---|---|
| 1,974,171 | Bizzari | Sept. 18, 1934 |
| 2,620,182 | Marston | Dec. 2, 1952 |
| 2,681,801 | Rottersmann | June 2, 1954 |